US006488567B1

(12) United States Patent
Flanders et al.

(10) Patent No.: US 6,488,567 B1
(45) Date of Patent: Dec. 3, 2002

(54) SYSTEM AND METHOD FOR AUTOMATED FIBER POLISHING

(75) Inventors: Dale C. Flanders, Lexington, MA (US); Jonathan R. Coppeta, Windham, NH (US); Steven C. Fawcett, Stoneham, MA (US); Jeffrey A. Korn, Lexington, MA (US)

(73) Assignee: Axsun Technologies, Inc., Billerica, MA (US)

( * ) Notice: Subject to any disclaimer, the term of this patent is extended or adjusted under 35 U.S.C. 154(b) by 51 days.

(21) Appl. No.: 09/711,029

(22) Filed: Nov. 9, 2000

(51) Int. Cl.[7] .................................................. B24B 49/00
(52) U.S. Cl. ............................. 451/6; 451/8; 451/287; 451/398
(58) Field of Search ............................. 451/5, 6, 8, 9, 451/10, 11, 28, 41, 37, 57, 65, 283, 285, 287, 390, 397, 398, 384, 364

(56) References Cited

U.S. PATENT DOCUMENTS

| | | | |
|---|---|---|---|
| 4,776,136 A | * 10/1988 | Abendschein et al. ...... 451/364 |
| 5,007,209 A | 4/1991 | Saito et al. | |
| 5,101,457 A | 3/1992 | Blonder et al. | |
| 5,106,394 A | 4/1992 | Bramson | |
| 5,184,433 A | * 2/1993 | Maack ......................... 451/41 |
| 5,403,227 A | * 4/1995 | Franklin et al. ............. 451/166 |
| 5,447,464 A | * 9/1995 | Franklin et al. ............. 451/57 |
| 5,480,344 A | * 1/1996 | Xu et al. ...................... 451/28 |
| 5,503,590 A | * 4/1996 | Saitoh et al. ................. 451/11 |
| 5,559,916 A | 9/1996 | Terao et al. | |
| 5,613,899 A | * 3/1997 | Weiss et al. ................ 451/245 |
| 5,743,787 A | 4/1998 | Ishiyama et al. | |
| 5,949,927 A | * 9/1999 | Tang ............................ 451/6 |
| 5,993,289 A | * 11/1999 | Allen et al. .................... 451/5 |
| 6,004,042 A | 12/1999 | Million et al. | |
| 6,102,785 A | 8/2000 | Chandler et al. | |
| 6,106,662 A | * 8/2000 | Bibby, Jr. et al. ........... 451/287 |
| 6,137,938 A | 10/2000 | Korn et al. | |
| 6,227,938 B1 | * 5/2001 | Cheetham et al. ............ 451/6 |
| 6,238,278 B1 | * 5/2001 | Haftmann ................... 451/390 |
| 6,347,974 B1 | * 2/2002 | Chandler et al. ............. 451/5 |

FOREIGN PATENT DOCUMENTS

| | | |
|---|---|---|
| EP | 0 294 650 | 12/1988 |
| EP | 1 046 935 A1 | 10/2000 |
| JP | 11262850 | 9/1990 |
| WO | WO 98/55891 | 12/1998 |
| WO | WO 00/28360 | 5/2000 |

* cited by examiner

*Primary Examiner*—Eileen P. Morgan
*Assistant Examiner*—Hadi Shakeri
(74) *Attorney, Agent, or Firm*—Mills & Onello, LLP

(57) ABSTRACT

An improved system and method for automated fiber polishing overcomes the limitations of conventional systems and methods. In particular, the present invention provides for continuous determination of the quality of the polish during a polishing procedure. An optical signal is transmitted to a fiber tip, and any back-reflected signal is detected and monitored to determine polish quality. In this manner, automated polishing quality assurance is provided in real time.

44 Claims, 4 Drawing Sheets

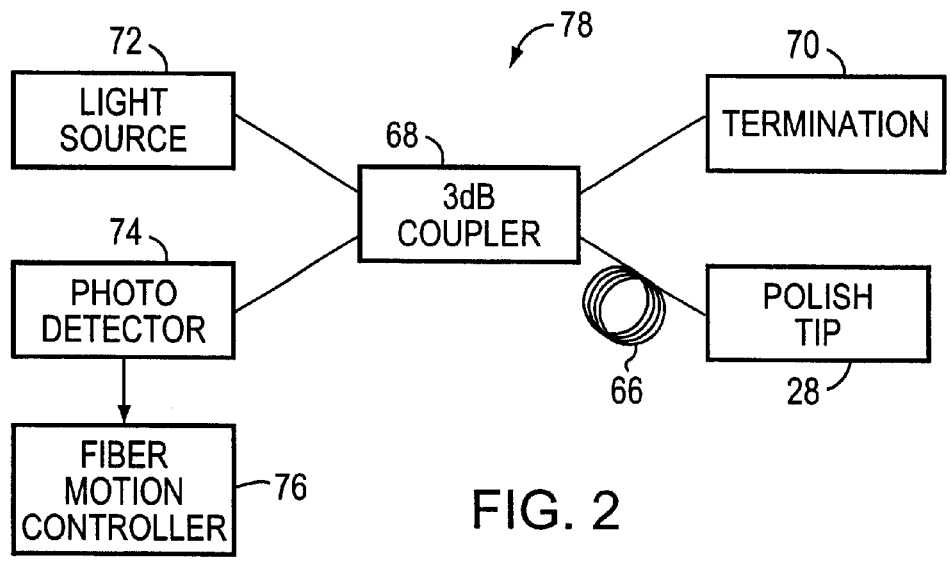
FIG. 2
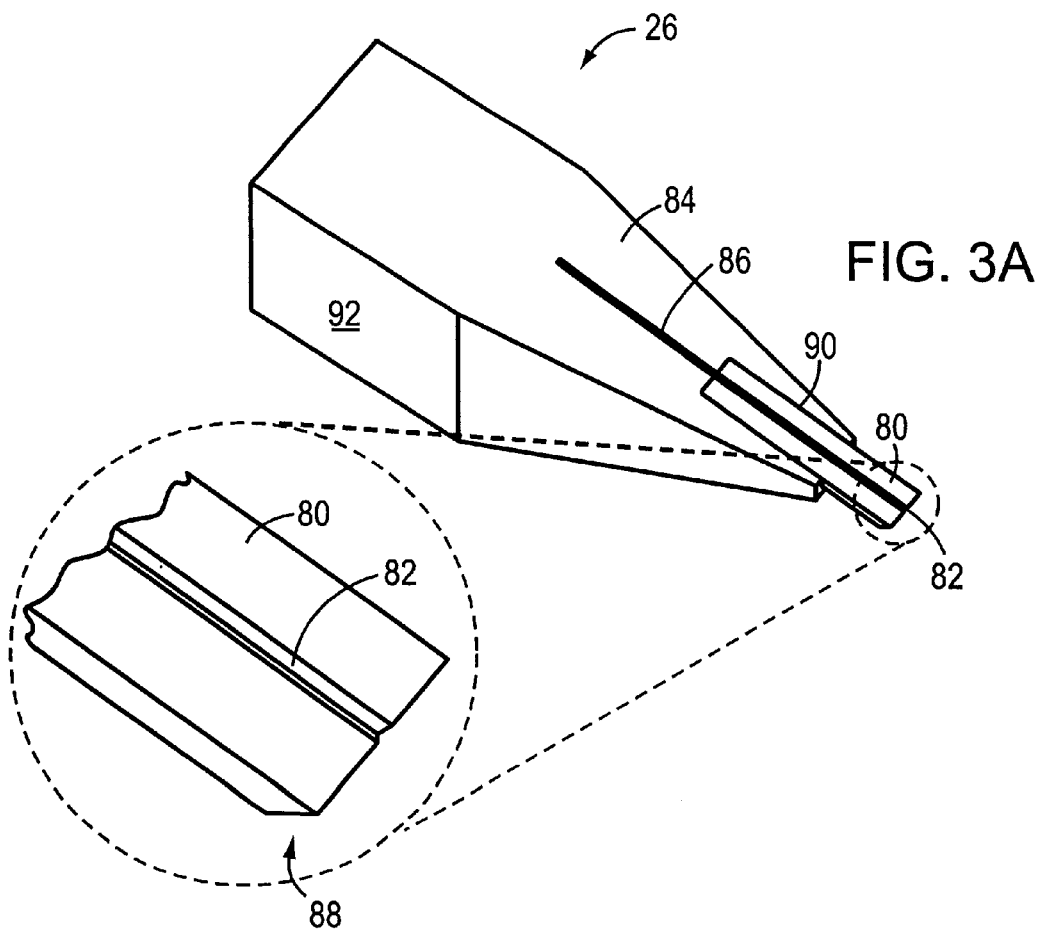
FIG. 3A
FIG. 3B

SYSTEM AND METHOD FOR AUTOMATED FIBER POLISHING

BACKGROUND OF THE INVENTION

In contemporary fiber optic systems, optimization of coupling efficiency between the optical fiber and active or passive devices is a key metric in system comparisons, such as the pumps used in fiber amplification systems. In a popular technique for improving coupling efficiency, an end of the optical fiber is polished to provide a lens shape at the end face. Hyperbolic-shaped end faces are among the most highly desired shapes, since they tend to provide the highest coupling efficiency.

A popular technique for fiber polishing involves the use of a motor-controlled jig to position the end face of a fiber in contact with a rotating abrasive wheel. Once in contact, the end face of the optical fiber is polished by the wheel to form a lens.

SUMMARY OF THE INVENTION

The present invention is directed to a system and method for fiber polishing that overcome the limitations of conventional systems and methods. In particular, the present invention provides for continuous and contemporaneous determination of the extent of the polish during a polishing procedure. An optical signal is transmitted to a fiber tip, and any back-reflected signal is detected and monitored to determine the polish. In this manner, an automated polishing quality assurance is provided in real-time, during the polishing operation.

According to a first embodiment, the present invention is directed to a system for polishing a tip of a fiber optic. The system includes a fiber tip polishing unit for positioning a fiber optic tip relative to a polishing surface. A control system controls the positioning of the fiber optic tip. A polishing feedback unit includes an optical source and an optical sensing unit. During a polishing operation, the optical source provides an optical monitoring signal in the fiber optic, and the optical sensing unit senses a portion of the monitoring signal inwardly reflected (i.e., back reflected) from the tip.

The fiber tip polishing unit preferably positions the fiber optic tip relative to the polishing surface in a plurality of degrees of freedom. In the present implementation, the tip is held in a silicon chuck.

The fiber tip polishing unit may further include a bearing along a longitudinal axis of the fiber tip for providing the fiber tip at the polishing surface at a controlled force. The bearing may comprise an air bearing.

The fiber tip polishing unit may further include a translation positioner along a longitudinal axis of the fiber tip, the translation positioner being coupled to the control system for controlling longitudinal positioning of the fiber tip with respect to the polishing surface.

The fiber tip polishing unit may further include a rotation positioner along a longitudinal axis of the fiber tip, the rotation positioner being coupled to the control system for controlling rotational positioning of the fiber tip about the longitudinal axis with respect to the polishing surface.

The fiber tip polishing unit may further include a lateral positioner coupled to the control system for controlling lateral positioning of the fiber tip with respect to the polishing surface.

The polishing surface may comprise a rotating polishing pad, and the fiber tip polishing unit may further include a pad motor coupled to the control system for controlling rotation rate of the polishing pad. An optional tilt positioner may be coupled to the control system for controlling tilt angle of the polishing surface with respect to the fiber tip.

The polishing feedback unit may further include an optical coupler, for example a 3 dB coupler, for dividing the monitoring signal generated at the optical source, such that a portion of the monitoring signal is delivered to the fiber optic tip in a first direction of propagation, and such that a portion of the monitoring signal inwardly reflected from the tip is delivered to the optical sensing unit in a second direction of propagation. An optional termination unit, for example an index-matching gel, substantially eliminates back reflection of a remaining portion of the monitoring signal propagating in the first direction.

The optical sensing unit may further generate a feedback signal based on the sensed portion of the monitoring signal for controlling the positioning of the fiber optic tip.

The control system preferably controls positioning of the fiber optic tip by controlling spatial positioning or force and orientation of the tip with respect to, and contact force with, the polishing surface.

According to a second embodiment, the present invention is directed to a method for polishing a tip of a fiber optic. The position of a fiber optic tip relative to a polishing surface is controlled. During a polishing operation, an optical monitoring signal is provided in the fiber optic, and a portion of the monitoring signal inwardly reflected from the tip is sensed.

In this manner, an apparatus and method are provided for automated fiber polishing by which the quality of the polish is monitored during the polishing operation, and, in response, a control system performs a real-time adjustment of the polishing apparatus.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 2 is a block diagram of the optical back-reflection detection circuit for the system of FIG. 1, in accordance with the present invention.

FIG. 3A is a close-up perspective view of a fiber optic chuck having a silicon microbench, in accordance with the present invention. Inset FIG. 3B is a close-up perspective view of the silicon microbench of FIG. 3A.

DETAILED DESCRIPTION OF PREFERRED EMBODIMENTS

Figure 1:
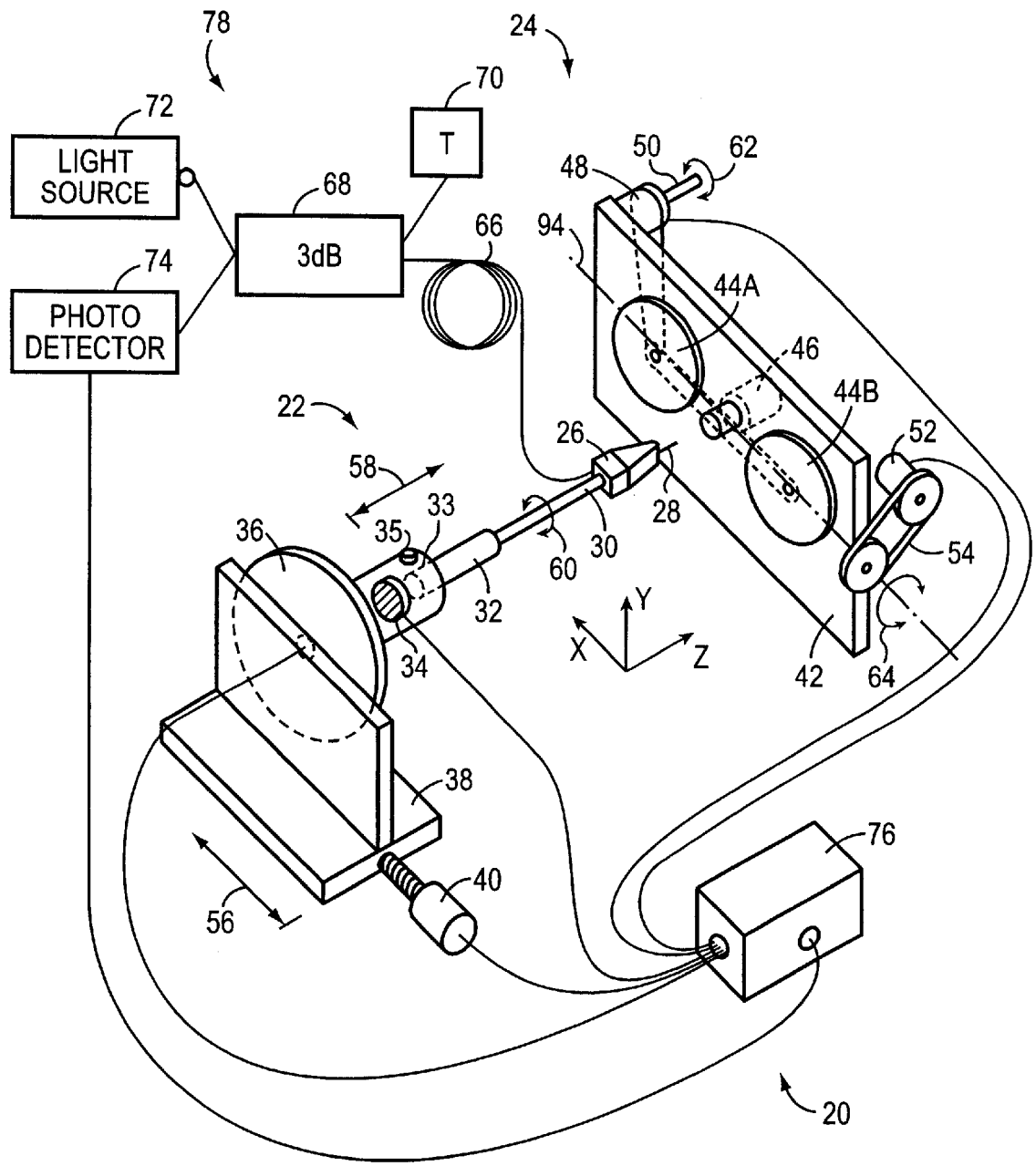
FIG. 1 is a perspective view of a system for fiber optic polishing, in accordance with the present invention.

With reference to FIG. 1 the fiber polishing apparatus 20 of the present invention comprises a fiber mount 22, a platen mount 24 including polishing platen 44, an optical signal back-detection circuit 78, and a fiber polishing motion controller 76. In combination, the components comprise a system for fiber polishing that provides enhanced efficiency and precision with continuous monitoring of the polishing operation during polishing.

The fiber mount 22 includes a motor mount 38 that supports a fiber rotation motor 36, a translation motor 34, rod mount 32, translation rod 30, and fiber chuck 26. A fiber optic tip 28, at the end of a fiber optic coil 66, is mounted to the fiber chuck 26, which in turn fixes the tip 28 in position relative to the chuck 26 during polishing. In one implementation, the end face is located 100 μm from the end of the chuck.

A close-up perspective view of the fiber chuck 26 is shown in FIG. 3A. The chuck 26 includes first and second mating bodies 92 formed, for example, of a lightweight material such as aluminum. Each of the mating bodies preferably has a finished mating surface 84 that includes a V-groove 86, and a recess at the distal end, shaped to support a precision grooved microbench 80 made, for example from, a hard, rigid, stable material such as silicon. The silicon microbench 80 preferably includes a V-groove 82 in alignment with the chuck upper-body V-groove 86, and comprises a machined body of silicon for supporting the fiber tip 28 at its interface with the polishing platen 44. As shown in inset FIG. 3B, the silicon microbench 80 may include a bevel 88 at its distal end to provide clearance for polishing of the tip 28 at steep angles, while retaining the tip 28 in close proximity to the end of the chuck 26 during polishing for enhanced precision.

While a first of the mating chuck bodies 92 is shown in FIG. 3, the second of the mating bodies (not shown) comprises a mirror image of body 92, including a V-groove 86, and silicon microbench 80 with V-groove 82, to form a channel with the first body for securing the top surface of the fiber tip 28. The upper and lower bodies are preferably hinged, or otherwise mated and clamped, so as to be fixed to each other during a polishing operation.

Returning to FIG. 1, the chuck 26 is mounted to a translation rod 30, preferably formed of a lightweight and rigid material to reduce excessive moments imparted by the rod 30 and chuck 26 on the motor mount 38. The translation rod 30 extends in a longitudinal direction to present the chuck 26 and fiber tip 28 to the platen 44.

The rod 30 is coupled to the rod mount 32 through an air bearing 33, which serves to create a low friction, low stiction, mechanical interface between the rod mount 32 and the rod, in the direction of the z-axis, yet rigid in the x-y plane. The chuck 26 and rod 30 are preferably rotationally fixed to each other. A translation (z-axis) motor 34 serves to extend and retract the chuck 26 and rod 30, in the rod mount 32 on the air bearing 33 along a longitudinal direction indicated by arrow 58. The translation motor 34 preferably comprises a closed-loop servomotor, for example a voice-coil-type motor, coupled to a controller 76, for controlled translation of the optical fiber tip 28 during a polishing operation.

The translation motor 34, air bearing 33, rod mount 32, translation rod 30, and chuck 26 are collectively, in turn, coupled to a fiber rotation motor 36 mounted to the motor mount 38. The fiber rotation motor 36 provides for collective rotation of the translation motor 34, air bearing 33, rod mount 32, translation rod 30, and chuck 26 in an angular direction indicated by arrow 60. The translation motor 34 preferably comprises a closed-loop servomotor coupled to the controller 76, for enhanced angular positioning of the optic 28 during a polishing operation.

The motor mount 38 is in turn coupled to a linear motor 40 for linear positioning of the fiber tip 28 relative to a centerline 94 of the platen 44 in a linear direction indicated by arrow 56 or x-axis direction. The linear motor 40 likewise preferably comprises a closed-loop servomotor coupled to the controller 76, for enhanced linear positoning of the optic 28 during a polishing operation.

The platen mount comprises a platen chassis 42 to which first and second polishing platens 44 are rotatably mounted, for example on a low-friction bearing. The polishing platens 44 comprise, for example; polishing pads of different grit values (abrasive sizes) such that coarse and fine polishing is accomplished by first positioning the fiber optic chuck 26 to present the fiber end face to the coarse-grit platen wheel 44A, followed by a linear shifting along a direction indicated by arrow 56 using the linear motor 40, to then present the fiber end face to the fine-grit platen wheel 44B. Alternatively, in other implementations, the platen wheels 44A, 44B comprise polishing pads of similar grit values, in order to double the service time period between pad replacements. Alternatively, a single platen wheel, or a plurality of platen wheels greater than two, may be provided, depending on the polishing application in the other implementations.

The platen wheels 44A, 44B are driven to rotate by a platen motor 48 mounted to the platen chassis 42. The platen motor includes a drive shaft 50 for transferring the rotation of the motor 48 axle, to angular movement of the platen 44 in a direction indicated by arrow 62. The platen motor 48 preferably comprises a closed-loop servomotor coupled to the controller 76, to control the angular velocity of the platen 44 during a polishing operation.

During a polishing operation, the fiber tip 28 is caused to be translated across the surface of the platen 44 by the linear motor along a direction indicated by arrows 56, so as to provide uniform wear of the polishing pads on the platen 44. Since the linear velocity of the platen increases with radial distance from the center if the angular velocity is unchanged, the angular velocity of the platen 44 is preferably adjusted by the controller 76 as the axial position of the fiber changes to provide a constant linear velocity to ensure polishing consistency. Alternatively, variations in linear velocity are provided by the system of the present invention, for applications that require such a feature.

The platen wheels 44A, 44B are bisected by a chassis centerline 94, along which, the fiber optic end face 28 is presented during a polishing operation. A platen tilt motor 52 is coupled to a platen tilt belt 54, in turn driving the angular positioning of the platen chassis 42 and platen wheels 44A, 44B about the centerline 94, along an angular direction indicated by arrow 64. The platen tilt motor 52 preferably comprises a closed-loop servomotor coupled to the controller 76, for enhanced control over the tilt of the platen wheels 44A,44B during a polishing operation. Platen tilt controls the angle at which the fiber optic tip 28 is polished. functions to urge the fiber tip against the platen 44 at a constant force because of the low-friction/stiction rod/rod mount interface. The lightweight rod 30 and chuck 26, in combination with the air bearing 33, allow the system to react to changes in the platen surface relatively quickly. Without these features, any bump or warp of the surface of the platen 44 would cause a temporary increase in pressure, which may cause the fiber tip to crack, or gouge the pads.

For example a wedge-shaped lens or a spheric shape could be created with the machine described above. This is accomplished by executing four polishing steps in one implementation. During the first and second steps, the fiber's position is controlled using a z-axis position encoder 35 and motor 34 in a closed-loop control method. The fiber is driven to a proscribed position into the platen surface so that the amount of material removed is known to within the system's accuracy. Material is removed from opposite sides of the fiber during each of the first two steps respectively. The first two steps are typically performed with a coarse-grit lapping film in order to decrease the polishing time.

Figure 4A:
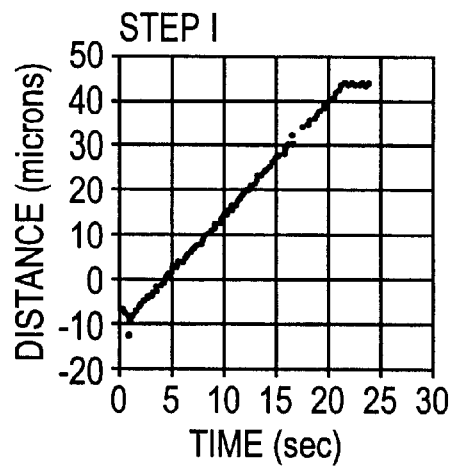
FIGS. 4A and 4B are plots of the distance measured by the encoder of FIG. 1 as a function of time for each side of the tip.
Figure 4B:
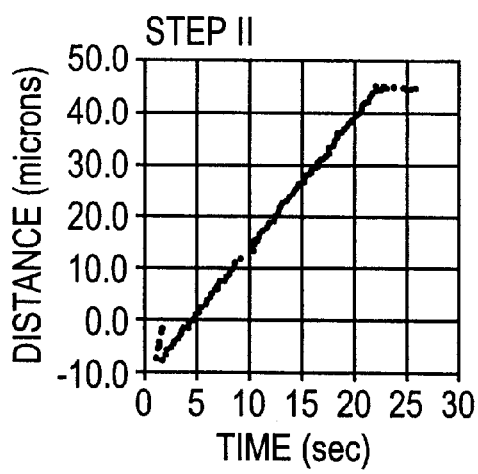

FIGS. 4A and 4B are plots of the distance measured by encoder 35 as a function of time for each of the side of the tip, respectively. As shown, during these position controlled steps, the distance is controlled in a linear fashion.

Figure 5A:
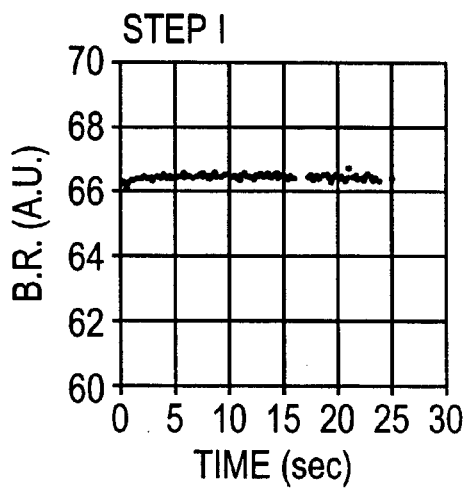
FIGS. 5A and 5B are plots of back reflection levels detected by the photo detector 74 of FIG. 1.
Figure 5B:
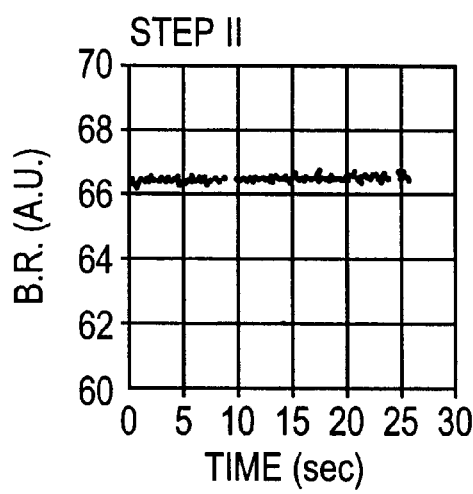

FIGS. 5A and 5B; are plots of the backreflection levels detected by the photodetector 74. In the preferred embodiment, during these initial polishing steps, only cladding material is removed. Thus, back reflection levels are not affected.

During the third and fourth polishing steps, an open-loop control method on motor 34 is implemented in order to create a constant force between the lapping film and the fiber. A constant current is applied to the translation motor 34, in order to apply a constant force to the fiber tip 28 by the fine-grit platen 44B. The optical feedback system 78, described below, is used to determine when the back reflected light intensity is 50% of its initial value in the third step. When the 50% point is reached, the fiber is retracted, rotated 180 degrees, and polished (fourth step) until the back reflection is negligible. In this manner, the wedge tip is assured to be centered relative to the fiber's core. The third and fourth steps are performed using a fine-grit lapping film to improve surface finish and control over polishing rates.

At any time during the polishing operation, the far-field emission pattern of light emitted from the fiber tip is visually inspected by positioning the tip 28 before camera 46, installed on the platen chassis 42 to provide visual feedback to an operator or controller 76.

During polishing, the present invention provides an enhanced automated feedback mechanism for analyzing the quality of the polish. The optical back-detection circuit 78 provides this function. The use of backreflection as a control signal during processing insulates the polishing process from concentricity variations and removes mode size variables when the backreflection light is the same wavelength as the operating wavelength of the final device.

With reference to both FIG. 1 and the block diagram of FIG. 2, the optical back-detection circuit 78 comprises a 3 dB coupler 68, a light source 72, a termination unit 70, a photodetector 76, and the controller 76. During polishing, a light signal, preferably a single-mode light signal, is generated by the light source 72 and presented to the 3 dB coupler or circulator 68. At the 3 dB coupler 68, 50% of the signal is provided to the optic 66, and 50% of the signal is provided to the termination unit 70. The termination unit 70 may comprise an index-matching gel or other material or apparatus that substantially eliminates back-reflection of the signal back toward the 3 dB coupler. Such unit is not required if a circulator is used.

The portion of the probe light signal that is provided to the fiber optic 66 propagates down the fiber optic 66 to the tip 20 undergoing polishing. Most of that portion is emitted from the fiber tip 28; however, a certain amount, for example approximately 4%, is back-reflected through the fiber body 66 to the 3 dB coupler 68. In an alternative implementation, the tip is coated prior to polishing to increase the level of back reflection. In one implementation the tip is metallized. At the coupler 68, back-reflected light is split as above —50% being propagated back to the source 72, and 50% being provided to a photo-detector 74. The photo-detector 74 determines the intensity of the back-reflected light, and provides an intensity signal, or related control signal, back to the controller 76. In response, the controller makes decisions with regard to position and orientation adjustments to the fiber tip 28 and the platen 44, in order to optimize the polishing procedure in real time.

Figure 4C:
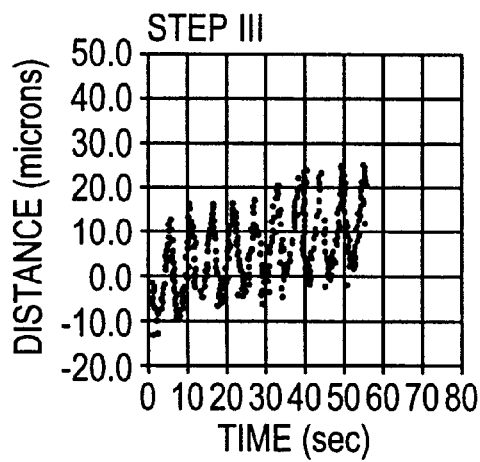
FIGS. 4C and 4D are plots of distance measured as a function of time during constant-force mode.
Figure 4D:
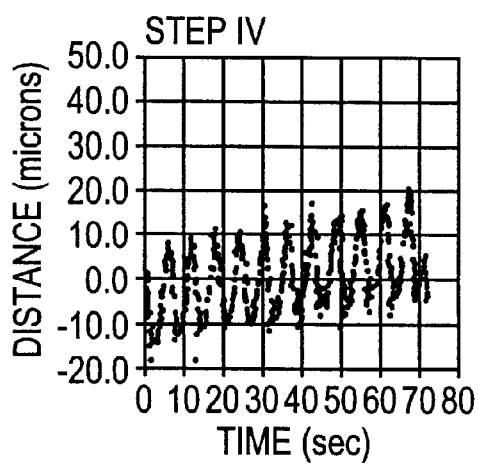
Figure 5C:
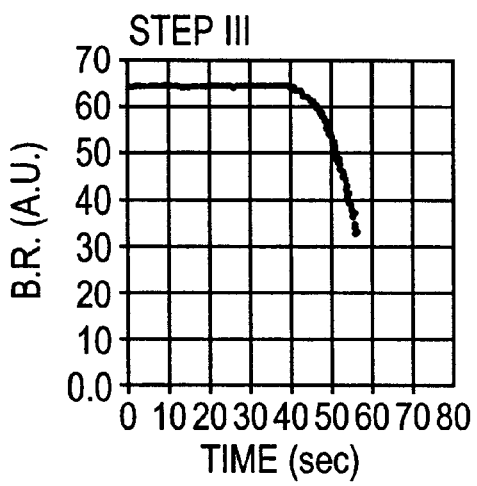
FIGS. 5C and 5D are plots of back reflection levels detected during constant-force mode.
Figure 5D:
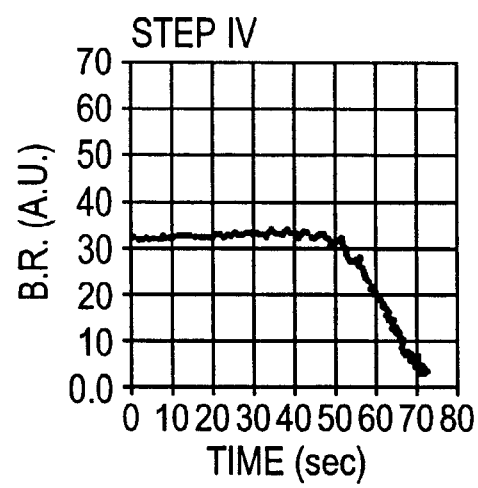

As an example, during polishing of a fiber, intensity of the back-reflected light is nearly constant until the core of the fiber tip 28 begins to undergo polishing. This is illustrated by FIGS. 5A and 5B as described previously. As the core becomes polished, as occurs in the third and fourth steps, light is reflected off the polished surface at a reduced angle, or the metal coating is removed, and therefore a higher percentage of light signal is output from the tip 28. The back reflection from polishing to a wedge shape as shown in FIGS. 5C and 5D. Prior to polishing, a peak back-reflection level is initially recorded at time 0 in FIG. 5C. The top half of the wedge is then polished until the back-reflection level reaches 50% of the peak, in the case of the metallized tip (see time 55 sec. in FIG. 5C). This polishing into the core is preferably done under force control, such as the constant force mode. This is illustrated by FIG. 4C. Distance slowly increases with time. Note the periodic oscillation resulting from pad wobble. The tip 28 is then rotated 180 degrees and the bottom half of the wedge is polished until the back-reflection level is reduced to substantially 0% as shown by FIG. 5D. The constant force mode is shown by FIG. 4D. In this manner, it is known that output coupling is optimized, while at the same time, a symmetric wedge shape is ensured.

The present invention is equally applicable to polishing of fiber tips to other shapes; however, analysis of the light signal is appropriately modified to in accordance with the light profile of the shape to be polished.

Following polishing, the optic tip 28 can be fused to cause the glass at the end of the tip 28 to become more rounded. An electric arc is applied across the tip, which causes the glass to melt. The surface tension of the glass and the intensity of the arc dictates the final, typically hyperbolic, shape of the glass tip.

While this invention has been particularly shown and described with references to preferred embodiments thereof, it will be understood by those skilled in the art that various changes in form and details may be made herein without departing from the spirit and scope of the invention as defined by the appended claims.

In one modification, the wavelength of the probe height is modulated to determine the shape of the tip. The longer wavelengths have a large mode size, which results in more of the power traveling in the cladding with typical Gaussian single mode distribution. Longer wavelengths are used to monitor cladding and cladding/core interface polishing, whereas shorter wavelengths are used to monitor polishing near the core center.

We claim:

1. A system for polishing a tip of a fiber optic comprising:
   a fiber tip polishing unit for positioning a tip of a fiber optic relative to a polishing surface;
   a control system for controlling the positioning of the fiber optic tip by the polishing unit; and
   a polishing feedback unit including: a optical source for, during a polishing operation, coupling an optical monitoring signal into the fiber optic to propagate to the fiber optic tip; and an optical sensing unit for sensing a portion of the monitoring signal that is back reflected from the tip to propagate back through the fiber optic.

2. The system of claim 1 wherein the fiber tip polishing unit positions the fiber optic tip relative to the polishing surface in a plurality of degrees of freedom.

3. The system of claim 1 wherein the fiber tip polishing unit further comprises a bearing along a longitudinal axis of the fiber tip.

4. The system of claim 3 wherein the bearing comprises an air bearing.

5. The system of claim 1 wherein the fiber tip polishing unit further comprises a translation positioner along a longitudinal axis of the fiber tip, the translation positioner coupled to the control system for controlling longitudinal positioning of the fiber tip with respect to the polishing surface.

6. The system of claim 1 wherein the fiber tip polishing unit further comprises a rotation positioner along a longitudinal axis of the fiber tip, the rotation positioner coupled to the control system for controlling rotational positioning of the fiber tip about the longitudinal axis with respect to the polishing surface.

7. The system of claim 1 wherein the fiber tip polishing unit further comprises a lateral positioner coupled to the control system for controlling lateral positioning of the fiber tip with respect to the polishing surface.

8. The system of claim 1 wherein the polishing surface comprises a rotating polishing pad.

9. The system of claim 8 wherein the fiber tip polishing unit further comprises a pad motor coupled to the control system for controlling rotation rate of the polishing pad.

10. The system of claim 1 wherein the fiber tip polishing unit further comprises a tilt positioner coupled to the control system for controlling tilt angle of the polishing surface relative to the fiber tip.

11. The system of claim 1 wherein the optical monitoring signal comprises a multiple wavelength signal.

12. The system of claim 1 wherein the polishing feedback unit further comprises an optical coupler for dividing the monitoring signal generated at the optical source, such that a portion of the monitoring signal is delivered to the fiber optic tip in a first direction of propagation, and such that a portion of the monitoring signal inwardly reflected from the tip is delivered to the optical sensing unit in a second direction of propagation.

13. The system of claim 12 further comprising a termination unit for substantially eliminating back reflection of a remaining portion of the monitoring signal propagating in the first direction.

14. The system of claim 13 wherein the termination unit comprises an index-matching gel.

15. The system of claim 12 wherein the optical coupler comprises a 3 dB coupler.

16. The system of claim 1 wherein the optical sensing unit comprises a photodiode.

17. The system of claim 1 wherein the optical sensing unit further generates a feedback signal based on the sensed portion of the monitoring signal for controlling the positioning of the fiber optic tip.

18. The system of claim 1 wherein the control system controls positioning of the fiber optic tip by controlling spatial positioning and orientation of the tip with respect to the polishing surface.

19. The system of claim 1 further comprising a fusing unit for applying an electric arc across the fiber tip.

20. The system of claim 1 wherein the fiber optic is metallized prior to polishing.

21. The system of claim 1, wherein the fiber tip polishing unit comprises a two-part rigid chuck for holding the fiber optic tip.

22. A method for polishing a tip of a fiber optic comprising:
controlling the position of a fiber optic tip relative to a polishing surface; and
during a polishing operation, coupling an optical monitoring signal into the fiber optic to propagate to the fiber optic tip, and sensing a portion of the monitoring signal back reflected from the tip to propagate back through the fiber optic.

23. The method of claim 22 further comprising positioning the fiber optic tip relative to the polishing surface at a plurality of degrees of freedom.

24. The method of claim 22 further comprising providing a bearing along a longitudinal axis of the fiber tip.

25. The method of claim 22 further comprising controlling longitudinal positioning of the fiber tip with respect to the polishing surface.

26. The method of claim 22 further comprising controlling rotational positioning of the fiber tip about the longitudinal axis with respect to the polishing surface.

27. The method of claim 22 further comprising controlling lateral positioning of the fiber tip with respect to the polishing surface.

28. The method of claim 22 wherein the polishing surface comprises a rotating polishing pad.

29. The method of claim 28 further comprising controlling rotation rate of the polishing pad.

30. The method of claim 22 further comprising controlling tilt angle of the polishing surface with respect to the fiber optic tip.

31. The method of claim 22 further comprising generating the optical monitoring signal as a multiple wavelength signal.

32. The method of claim 22 further comprising dividing the monitoring signal at an optical coupler such that a portion of the monitoring signal is delivered to the fiber optic tip in a first direction of propagation, and such that a portion of the monitoring signal inwardly reflected from the tip is delivered to the optical sensing unit in a second direction of propagation.

33. The method of claim 32 further comprising substantially eliminating back reflection of a remaining portion of the monitoring signal propagating in the first direction at a termination.

34. The method of claim 22 further comprising generating a feedback signal based on the sensed portion of the monitoring signal and controlling the position of the fiber optic tip in response to the feedback signal.

35. The method of claim 22 wherein controlling the position of the fiber optic tip relative to the polishing surface comprises controlling spatial positioning and orientation of the tip with respect to the polishing surface.

36. The method of claim 22 further comprising, fusing the fiber tip with an applied electric arc.

37. The method of claim 22 further comprising metallizing the tip prior to polishing.

38. A system for polishing a tip of a fiber optic comprising:
a positioner for positioning a fiber optic tip relative to a polishing surface;
a control system for controlling the positioner to maintain a substantially constant force imparted on the fiber optic tip by the polishing surface during a polishing operation;

and air bearing along a longitudinal axis of the fiber optict tip; and a polishing feedback unit including: and optical source for, during a polishing operation, coupling an optical monitoring signal into the fiber optic to propagate to the fiber optic tip; and an optical sensing unit for sensing a portion of the monitoring signal that is back reflected from the tip to propagate back through the fiber optic.

39. A method for polishing a tip of a fiber optic comprising:

positioning a fiber optic tip relative to a polishing surface;

controlling the positioning of the fiber optic tip in order to maintain a substantially constant force imparted on the fiber optic tip by the polishing surface during a polishing operation;

providing an air bearing along a longitudinal axis of the fiber optic tip; and during a polishing operation, coupling an optical monitoring signal into the fiber optic to propagate to the fiber optic tip, and sensing a portion of the monitoring signal back reflected from the tip to propagate back through the fiber optic.

40. A system for polishing a tip of a fiber optic comprising:

a fiber tip polishing unit for positioning a fiber optic tip relative to a polishing surface;

a control system for controlling the positioning of the fiber optic tip by the polishing unit; and a polishing feedback unit including: a optical source for, during a polishing operation, providing an optical monitoring signal in the fiber optic; an optical sensing unit for sensing a portion of the monitoring signal back reflected from the tip; and an optical coupler for dividing the monitoring signal generated at the optical source, such that a portion of the monitoring signal is delivered to the fiber optic tip in a first direction of propagation, and such that a portion of the monitoring signal inwardly reflected from the tip is delivered to the optical sensing unit in a second direction of propagation.

41. The system of claim 40 further comprising a termination unit for substantially eliminating back reflection of a remaining portion of the monitoring signal propagating in the first direction.

42. The system of claim 41 wherein the termination unit comprises an index-matching gel.

43. The system of claim 40 wherein the optical coupler comprises a 3 dB coupler.

44. A method for polishing a tip of a fiber optic comprising:

controlling the position of a fiber optic tip relative to a polishing surface;

during a polishing operation, providing an optical monitoring signal in the fiber optic, and sensing a portion of the monitoring signal back reflected from the tip; and dividing the monitoring signal at an optical coupler such that a portion of the monitoring signal is delivered to the fiber optic tip in a first direction of propagation, and such that a portion of the monitoring signal inwardly reflected from the tip is delivered to the optical sensing unit in a second direction of propagation.

* * * * *

UNITED STATES PATENT AND TRADEMARK OFFICE
CERTIFICATE OF CORRECTION

PATENT NO.     : 6,488,567 B1
DATED          : December 3, 2002
INVENTOR(S)    : Dale C. Flanders et al.

It is certified that error appears in the above-identified patent and that said Letters Patent is hereby corrected as shown below:

<u>Column 9,</u>
Line 3, delete "and" and insert -- an --.

Signed and Sealed this

Fifteenth Day of April, 2003

JAMES E. ROGAN
*Director of the United States Patent and Trademark Office*